July 11, 1961 J. MÜLLER 2,992,036
FUEL-TANK INLET PIPE CONSTRUCTION IN MOTOR VEHICLES
Filed Nov. 13, 1956
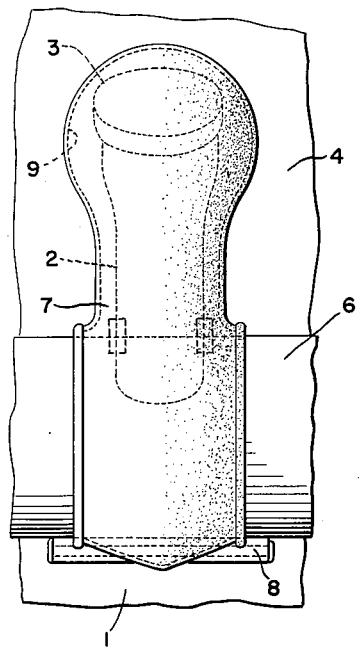
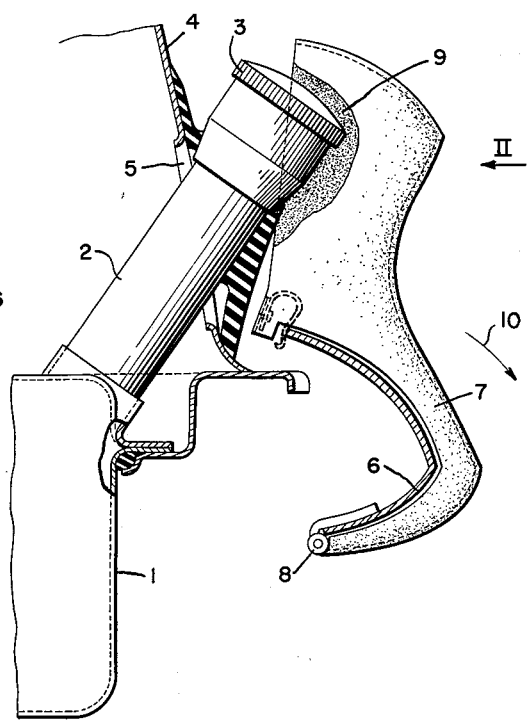
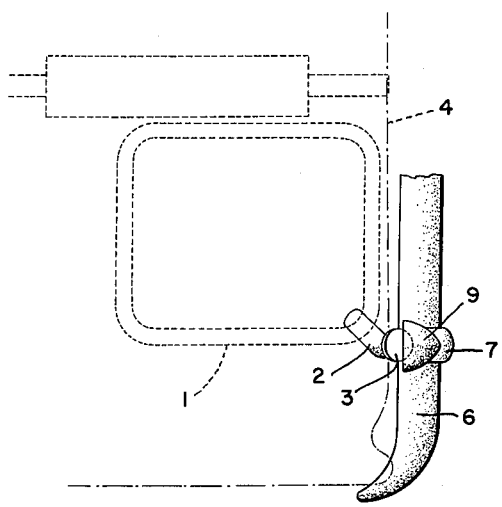
INVENTOR
JOSEF MÜLLER
BY
ATTORNEYS

United States Patent Office 2,992,036
Patented July 11, 1961

2,992,036
FUEL-TANK INLET PIPE CONSTRUCTION IN MOTOR VEHICLES

Josef Müller, Stuttgart-Riedenberg, Germany, assignor to Daimler-Benz Aktiengesellschaft, Stuttgart-Untertürkheim, Germany
Filed Nov. 13, 1956, Ser. No. 621,883
Claims priority, application Germany Nov. 12, 1955
2 Claims. (Cl. 296—1)

The present invention relates to a motor vehicle body provided with a fuel tank located in the rear of the vehicle and with an inlet or filler pipe extending upwardly from the tank through the rear wall of the vehicle body, and wherein the inlet pipe is accessible through a cover arrangement in proximity of the rear bumper of the vehicle.

In known arrangements of this type, a separate cover lid or the like is provided which is pivotally secured to the body in a joint below the inlet pipe.

The present invention aims at a simplification of such an arrangement in that the inlet pipe is covered in accordance with the present invention by a part arranged at the bumper of the vehicle body which preferably forms a constructional unit with the bumper.

The inlet pipe in a vehicle body, in which the inlet pipe is disposed to one side of the rear wall of the body, may be thereby advantageously covered by an upwardly extending bumper guard which according to another feature of the present invention is pivotally arranged about a hinge axis at the bumper, preferably about an axis disposed along the lower or bottom side of the bumper.

Furthermore, in order to secure the bumper guard in a position, in which it covers the inlet pipe, any suitable detent or notch means may be provided at the bumper or at the pivotal bumper guard.

Moreover, the side of the bumper guard facing the inlet pipe may be formed advantageously in a trough-like manner so that the bumper guard at least partially extends over the inlet pipe. Additional, a security mechanism which is adapted to be locked, for example, by means of a key, may be provided for the pivotal bumper guard covering the inlet pipe to prevent unauthorized access to the cap covering the inlet pipe.

Accordingly, it is an object of the present invention to provide a simple and effective means for covering the inlet pipe leading to the fuel tank of a motor vehicle without the need of any additional parts other than those already normally found on the vehicle.

Another object of the present invention is the provision of a cover for the fuel-tank inlet pipe extending through the rear wall of the vehicle which is constituted by a bumper guard pivotally secured to the bumper of the vehicle.

These and other objects, features, and advantages of the present invention will become more obvious from the following description when taken in connection with the accompanying drawing which shows, for purposes of illustration only, one preferred embodiment in accordance with the present invention, and wherein:

FIGURE 1 is a cross-sectional view through the rear part of a motor vehicle provided with an inlet pipe for the fuel tank extending through the body rear wall and with a cover means therefor in accordance with the present invention.

FIGURE 2 is a rear view of FIGURE 1 taken in the direction of the arrow II, and

FIGURE 3 is a plan view, on a reduced scale, of the overall arrangement shown in FIGURE 1.

Referring now more particularly to the drawing wherein like reference numerals are used throughout the various views to designate like parts, reference numeral 1 designates a fuel tank of any suitable construction which is disposed below the rear end of the vehicle body, for example, below the luggage space. The inlet pipe or nipple 2 of the fuel tank which is provided with a closure cap 3 extends upwardly from the fuel tank 1 at an incline to one side of the rear wall 4 of the vehicle body and projects therethrough through an aperture 5 provided in a portion of the rear wall 4 in proximity of the rear horizontal bumper 6. The apertured portion of the rear wall 4 is generally flush with the general exterior contour of the vehicle body. The rear bumper 6 may be of any suitable construction.

One of the two bumper guards 7 which are ordinarily arranged in close-fitting arrangement to the bumper 6 on both sides of the longitudinal center plane of the vehicle body and which ordinarily extend upwardly, is pivotally secured at the bottom or underside of the bumper 6 by means of a hinge 8 so that in the illustrated position, as shown in FIGURE 1, it extends with the trough-shaped opening 9 thereof at least in part over the inlet pipe 2 with the closure cap 3. The bumper guard 7 which covers and partially encloses the end of the inlet pipe 2 is itself very sturdy and secured to the bumper 6 in such a manner as to protect the inlet pipe 2 from damage by collision. By pivoting the bumper guard 7 about the axis of the hinge 8 in the direction of the arrow 10 an unimpeded access to the inlet pipe 2 is thereby rendered possible.

Any suitable detent or latch means (not illustrated herein) may be provided at the hinge 8 or at any other part of the bumper guard which comes in contact with the bumper in order to secure the bumper guard 7 in position when the bumper guard 7 assumes the position illustrated in FIGURE 1 in which it covers at least in part the inlet pipe 2 and the closure cap 3.

Such latch or detent means may be arranged in the hinge 8 and may be of any suitable conventional construction, even with a locking mechanism, if so desired, or may take the form of a latching spring arm extending around the upper edge of the bumper 6 or of a projection secured to or formed integral with the bumper guard 7 and extending into an appropriate opening in bumper 6 where it may be held in position by a spring detent or latch mechanism which may also be provided with a key-locking mechanism to prevent unauthorized access to the cap 3. However, it is also understood that the projection may be secured to the bumper 6 and the opening be provided in the bumper guard 7.

It is also understood that the shape of the bumper guard 7 may be varied within the spirit of the present invention to cover the cap 3 of the inlet pipe 2 to a greater or lesser extent so long as it performs the intended purposes of shielding and protecting the same, as outlined hereinabove.

While I have shown and described only one preferred embodiment in accordance with the present invention, it is understood that the same is susceptible of many changes and modifications in accordance with the present invention, and I intend to cover all such changes and modifications except as defined by the appended claims.

I claim:
1. In a motor vehicle with a body having a rear wall and a fuel tank disposed in the rear of the vehicle, the combination comprising an inlet pipe extending upwardly and rearwardly from said fuel tank through an aperture in a portion of said rear wall which is flush with the general contour of the vehicle body, a bumper having at least one bumper guard spaced from said vehicle body, said inlet pipe projecting beyond said wall in proximity of said bumper guard, said bumper guard forming a protective cover means for said inlet pipe and being so constructed and arranged with respect to said bumper as to be capable of resisting collision forces which would damage said pipe, and means pivotally securing said cover means to said bumper to enable the cover means to be moved to gain access to said inlet pipe, the pivot axis of said pivot means being disposed at the bottom side of said bumper, said bumper guard extending upwardly from the pivot means and around the rear side of said bumper in close-fitting relationship thereto and including an upwardly extending recessed portion into which said pipe extends.

2. In a motor vehicle with a body having a rear panel which partially defines the exterior contour of the body and a fuel tank disposed in the rear of the vehicle, the combination comprising an inlet pipe extending upwardly and rearwardly from said fuel tank through an aperture in a portion of said rear panel of the vehicle body, said apertured rear panel portion being flush with the general exterior contour of the body, bumper means fixedly secured to the vehicle and including a horizontal bumper to the rear of said rear panel for protecting at least a part thereof, said inlet pipe projecting from said rear panel and terminating a short distance therefrom and above said bumper, a bumper guard mounted on the bumper in spaced relationship to said rear panel and extending around the rear side of said bumper in close-fitting relationship thereto, said bumper guard having a recessed portion extending upwardly from said bumper into which said inlet pipe extends, and means for supporting said bumper guard on said bumper for movement rearwardly relative thereto to provide access to the end of said inlet pipe, said bumper guard and said bumper forming a constructional protective unit to protect the inlet pipe against damage by collision.

References Cited in the file of this patent

UNITED STATES PATENTS

| | | |
|---|---|---|
| 1,699,473 | Maier | Jan. 15, 1929 |
| 2,106,206 | Crossen et al. | Jan. 25, 1938 |
| 2,194,459 | Frank | Mar. 26, 1940 |
| 2,446,347 | Walkowiak | Aug. 3, 1948 |
| 2,708,594 | MacPherson | May 17, 1955 |
| 2,798,759 | Frederick et al. | July 9, 1957 |